(12) United States Patent
Tan et al.

(10) Patent No.: US 9,832,716 B2
(45) Date of Patent: Nov. 28, 2017

(54) SWITCHING BETWEEN NETWORKS BASED ON QUALITY OF AVAILABLE NETWORKS

(71) Applicant: Google Inc., Mountain View, CA (US)

(72) Inventors: Weihua Tan, Fremont, CA (US); Anil Muthineni, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/824,326

(22) Filed: Aug. 12, 2015

(65) Prior Publication Data

US 2017/0048789 A1     Feb. 16, 2017

(51) Int. Cl.
| | |
|---|---|
| H04W 4/00 | (2009.01) |
| H04W 48/18 | (2009.01) |
| H04W 36/30 | (2009.01) |
| H04B 17/318 | (2015.01) |
| H04L 12/26 | (2006.01) |
| H04W 76/02 | (2009.01) |

(52) U.S. Cl.
CPC .......... *H04W 48/18* (2013.01); *H04B 17/318* (2015.01); *H04L 43/16* (2013.01); *H04W 36/30* (2013.01); *H04W 76/023* (2013.01)

(58) Field of Classification Search
CPC ........ H04W 88/02; H04W 4/02; H04W 88/06
USPC ........................... 455/422.1, 423, 435.2, 434
See application file for complete search history.

(56) References Cited

U.S. PATENT DOCUMENTS 6,381,315 B1    4/2002    Nhaissi 7,180,898 B2    2/2007    Yoshida et al.
7,433,929 B2    10/2008   Guilford et al.
(Continued)

FOREIGN PATENT DOCUMENTS

EP    1885144 A2    2/2008
EP    2244501 A1    10/2010
(Continued)

OTHER PUBLICATIONS

Bircher et al., "An Agent-Based Architecture for Service Discovery and Negotiation in Wireless Networks," University of Bern, Wired/Wireless Internet Comms. (WWIC), Jan. 21, 2004.

(Continued)

*Primary Examiner* — Nghi H Ly
(74) *Attorney, Agent, or Firm* — Faegre Baker Daniels LLP

(57) ABSTRACT

A wireless communication enabled device can establish a connection with a wireless communications network and can assign a network quality score to the wireless communications network based on one or more characteristics of the wireless communications network. The wireless communication enabled device can observe a current quality of the connection with the wireless communications network. If the quality of the network connection has degraded below a threshold level, the wireless communication enabled device can start a network reevaluation timer. The length of time monitored by the network reevaluation timer can be based on the assigned network quality score. Upon expiration of the network reevaluation timer, the wireless communication enabled device reevaluates the quality of the network connection. If the network connection is still in a degraded state at the time of reevaluation, the wireless communication enabled device may switch to another available wireless communications network.

20 Claims, 4 Drawing Sheets

(56) References Cited

U.S. PATENT DOCUMENTS

| | | | |
|---|---|---|---|
| 7,809,360 | B2 | 10/2010 | Agrawal et al. |
| 8,036,367 | B2 | 10/2011 | Baluja et al. |
| 8,089,939 | B1 | 1/2012 | Mater et al. |
| 8,391,192 | B2 | 3/2013 | Prakash et al. |
| 8,396,470 | B2 | 3/2013 | Wormald |
| 8,423,046 | B2 | 4/2013 | Phillips |
| 8,484,568 | B2 | 7/2013 | Rados et al. |
| 8,792,328 | B2 | 7/2014 | Yang et al. |
| 8,934,361 | B2 | 1/2015 | He et al. |
| 2002/0169716 | A1 | 11/2002 | Johnson et al. |
| 2004/0246920 | A1 | 12/2004 | Savolainen |
| 2005/0059400 | A1 | 3/2005 | Jagadeesan et al. |
| 2007/0037550 | A1 | 2/2007 | Armstrong |
| 2007/0147317 | A1 | 6/2007 | Smith et al. |
| 2008/0009279 | A1 | 1/2008 | Sakawa |
| 2008/0107051 | A1 | 5/2008 | Chen et al. |
| 2008/0220784 | A1 | 9/2008 | Somasundaram et al. |
| 2008/0316969 | A1 | 12/2008 | Prakash et al. |
| 2010/0304737 | A1 | 12/2010 | Jain et al. |
| 2011/0096673 | A1 | 4/2011 | Stevenson et al. |
| 2011/0306318 | A1 | 12/2011 | Rodgers et al. |
| 2011/0310762 | A1* | 12/2011 | Choi ............... H04W 72/0406 370/252 |
| 2012/0052914 | A1 | 3/2012 | Yaqub et al. |
| 2012/0094653 | A1 | 4/2012 | Okuda |
| 2012/0195223 | A1 | 8/2012 | Raleigh |
| 2012/0282915 | A1 | 11/2012 | Haynes et al. |
| 2013/0148567 | A1 | 6/2013 | Efrati et al. |
| 2013/0155842 | A1 | 6/2013 | Moore et al. |
| 2013/0344873 | A1 | 12/2013 | Sane et al. |
| 2014/0003342 | A1 | 1/2014 | Sheriff et al. |
| 2014/0052774 | A1* | 2/2014 | Pollack ............ H04W 52/0241 709/203 |
| 2015/0098393 | A1 | 4/2015 | Totighbakhsh et al. |
| 2015/0127939 | A1 | 5/2015 | Mazandarany et al. |
| 2015/0141037 | A1 | 5/2015 | Saha et al. |
| 2015/0281198 | A1 | 10/2015 | Lee et al. |
| 2016/0037340 | A1 | 2/2016 | Rayment et al. |
| 2016/0261596 | A1 | 9/2016 | Khello et al. |

FOREIGN PATENT DOCUMENTS

| | | |
|---|---|---|
| WO | 2002-041580 A1 | 5/2002 |
| WO | 2004-047476 A1 | 6/2004 |
| WO | 2006-005947 A1 | 1/2006 |
| WO | 2008060464 A1 | 5/2008 |
| WO | 2011-162688 A1 | 12/2011 |
| WO | 2015158263 A1 | 10/2015 |

OTHER PUBLICATIONS

Silverman, Dwight, "Thinking of changing cellphone carriers? Check this app first," http://blog.chron.com/techblog/2011/06/thinking-of-changing-cellphone-carriers-check-this-app-first/, Houston Chronicle Techblog, Jun. 15, 2011.

VoLGA Forum, "VoLGA Stage 2 V1.7.0: Voice over LTE via Generic Access," Jun. 14, 2010.

Qualcomm Europe et al., "Text Proposal for UE Measurements for Minimizing Drive Tests," 3GPP TSG-RAN WG2 Meeting #66, R2-093175, May 4-8, 2009.

Qualcomm Europe, "Framework for UE SON Reports," 3GPP TSG RAN WG3 & SA WG5, S5-090017, Jan. 12-13, 2008.

CMCC, "Network Selection for WLAN/3GPP Radio Interworking," 3GPP TSG-RAN WG2 Meeting 81#bis, R2-130973, Apr. 15-19, 2013.

Niikravesh et al., "Mobile Network Performance from User Devices: A Longitudinal, Multidimensional Analysis," Passive and Active Measurement: 15th International Conference, PAM 2014, Mar. 10-11, 2014.

Venkiteswaran, Sriram, "Google Project Fi—New Era for Mobile Technology?", http://blog.mojonetworks.com/google-project-fi-new-era-for-mobile-technology, MojoBlog, May 19, 2015.

European Patent Office, International Search Report and Written Opinion for PCT Application No. PCT/US2016/046671 (related to above-captioned patent application), dated Oct. 14, 2016.

Ericsson: "RAN-ANDSF Interwor", 3GPP Draft; R2-133440-WLAN 3GPP Radio Interworking—ANDSF Interworking, 3rd Generation Partnership Project (3GPP), Mobile Competence Centre; vol. RAN WG2; Sep. 27, 2013.

Ericsson et al.: "Analysis of WLAN-3GPP interworking solutions", 3GPP Draft; R2-131388—Analysis of WLAN 3GPP Interworking Solutions, 3rd Generation Partnership Project (3GPP), Mobile Competence Centre; vol. RAN WG2; Apr. 6, 2013.

* cited by examiner

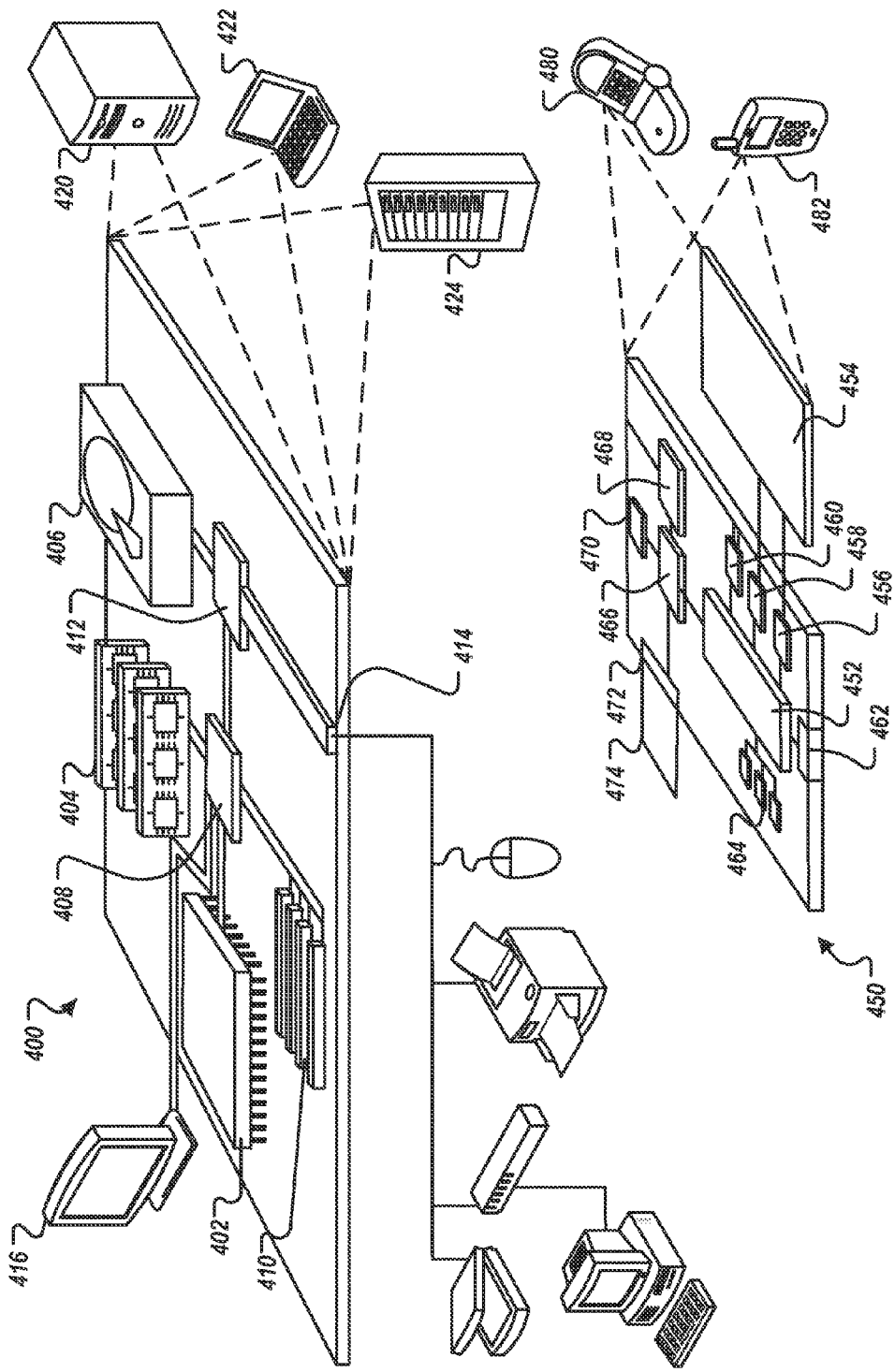

SWITCHING BETWEEN NETWORKS BASED ON QUALITY OF AVAILABLE NETWORKS

TECHNICAL FIELD

This technology relates to wireless communications networks, and more particularly to wireless network selection by a wireless communication enabled device.

BACKGROUND

At many geographic locations, there are a plurality of wireless networks to which a client device is able to connect. Typically, an available wireless network is selected by a client device or a user of the client device. In some cases, a client device can select a wireless network based on a contractual relationship between a customer of the client device and a service provider that is associated with a particular wireless network.

SUMMARY

A wireless communication enabled device can establish a network connection with a wireless communications network in an area with multiple available wireless communications networks. The wireless communication enabled device can assign a network quality score to the wireless communications network based on a number of factors, including the type of mobile telecommunications technology employed by the wireless communications network, the service provider associated with the wireless communications network, and historically-observed communication speeds for the wireless communications network. The wireless communication enabled device can observe a current quality of the connection with the wireless communications network. If the quality of the network connection has degraded below a threshold level, the wireless communication enabled device can start a network reevaluation timer. The length of time monitored by the network reevaluation timer can be based on the network quality score that is assigned to the wireless communications network. Upon expiration of the network reevaluation timer, the wireless communication enabled device reevaluates the quality of the network connection. If the network connection is still in a degraded state at the time of reevaluation, the wireless communication enabled device may switch to another available wireless communications network.

In general, one innovative aspect of the subject matter described in this specification can be embodied in methods that include the actions of establishing, by a computing device, a connection with a first wireless communication network; identifying, by the computing device, a characteristic of the first wireless communication network; determining, by the computing device and at a first point in time, that the connection with the first wireless communication network has degraded below a threshold quality level; identifying, by the computing device, a time at which to reevaluate whether the connection with the first wireless communication network is still below the threshold quality level, the time identified at least partially based on the characteristic of the first wireless communication network; determining, by the computing device, at a second point in time and in response to having determined that the time at which to reevaluate whether the connection with the first wireless communication network is still below the threshold quality level has expired, that the connection with the first wireless communication network is still below the threshold quality level; and responsive to determining, at the first point in time, that the connection with the first wireless communication network had degraded below the threshold quality level and determining, at the second point in time, that the connection with the first wireless communication network was still below the threshold quality level, establishing, by the computing device, a connection with a second wireless communication network. Other embodiments of this aspect include corresponding systems, apparatus, and computer programs, configured to perform the actions of the methods, encoded on computer storage devices.

These and other embodiments can each optionally include one or more of the following features. The characteristic can identify a mobile communication technology employed by the first wireless communication network. Identifying the characteristic of the first wireless communication network can include identifying the characteristic based on historically observed network connectivity speeds for the first wireless communication network. Identifying the time at which to reevaluate whether the connection with the first wireless communication network is still below the threshold quality level can include assigning a rating to the first wireless communication network, the rating being based on at least one of a mobile communication technology employed by the first wireless communication network and historically observed network connectivity speeds for the first wireless communication network. The characteristic can identify a wireless communications service provider associated with the first wireless communication network. The threshold quality level can be determined based on historically observed network connectivity quality for a plurality of wireless communication networks.

The actions can further include identifying, by the computing device, a characteristic of the second wireless communication network; determining, by the computing device and at a third point in time, that the connection with the second wireless communication network has degraded below the threshold quality level; identifying, by the computing device, another time at which to reevaluate whether the connection with the second wireless communication network is still below the threshold quality level at least partially based on the characteristic of the second wireless communication network; determining, by the computing device, at a fourth point in time and in response to having determined that the another time at which to reevaluate whether the connection with the second wireless communication network is still below the threshold quality level has expired, that the connection with the second wireless communication network is still below the threshold quality level; and responsive to determining, at the third point in time, that the connection with the second wireless communication network had degraded below the threshold quality level and determining, at the fourth point in time, that the connection with the first wireless communication network was still below the threshold quality level, establishing, by the computing device, a connection with a third wireless communication network.

The time at which to reevaluate whether the connection with the first wireless communication network is still below the threshold quality level can be identified using a first reevaluation length of time calculated based on the characteristic of the first wireless communication network. The another time at which to reevaluate whether the connection with the second wireless communication network is still below the threshold quality level can be identified using a second reevaluation length of time calculated based on the characteristic of the second wireless communication network. The first reevaluation length of time can be different than the second reevaluation length of time.

The actions can further include identifying, by the computing device, a characteristic of the second wireless communication network; comparing, by the computing device, the characteristic of the first wireless communication network to the characteristic of the second wireless communication network to determine that the characteristic of the first wireless communication network is superior to the characteristic of the second wireless communication network; and responsive to determining that the characteristic of the first wireless communication network is superior to the characteristic of the second wireless communication network, ending the connection with the second wireless communication network and establishing another connection with the first wireless communication network.

The actions can further include identifying, by the computing device, a minimum length of time to maintain the another connection with the first wireless communication network; determining, by the computing device, at a third point in time, and in response to having determined that the minimum length of time to maintain the another connection with the first wireless communication network has expired, that the another connection with the first wireless communication network has degraded below a threshold quality level; identifying, by the computing device, another time at which to reevaluate whether the another connection with the first wireless communication network is still below the threshold quality level at least partially based on the characteristic of the first wireless communication network; determining, by the computing device, at a fourth point in time and in response to having determined that the another time at which to reevaluate whether the another connection is still below the threshold quality level has expired, that the another connection with the first wireless communication network is still below the threshold quality level; and responsive to determining, at the third point in time, that the another connection with the first wireless communication network had degraded below the threshold quality level and determining, at the fourth point in time, that the another connection with the first wireless communication network was still below the threshold quality level, establishing, by the computing device, a connection with a third wireless communication network.

Particular embodiments of the subject matter described in this specification can be implemented to realize none, one, or more of the following advantages. A mobile computing device can avoid switching between wireless communications networks at a higher than optimal rate. A mobile computing device can identify suboptimal network connections and switch between networks due to degradation in network connection quality while preserving battery life. A balance between identifying and establishing a network connection with a wireless communication network having an improved connection quality and avoiding switching between networks at a higher than optimal rate can be achieved. Wireless communications can be improved in scenarios in which a mobile computing device does not have full information about available wireless communications networks.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 is a block diagram of an example computer system.

Like reference symbols in the various drawings indicate like elements.

DETAILED DESCRIPTION

Figure 1:
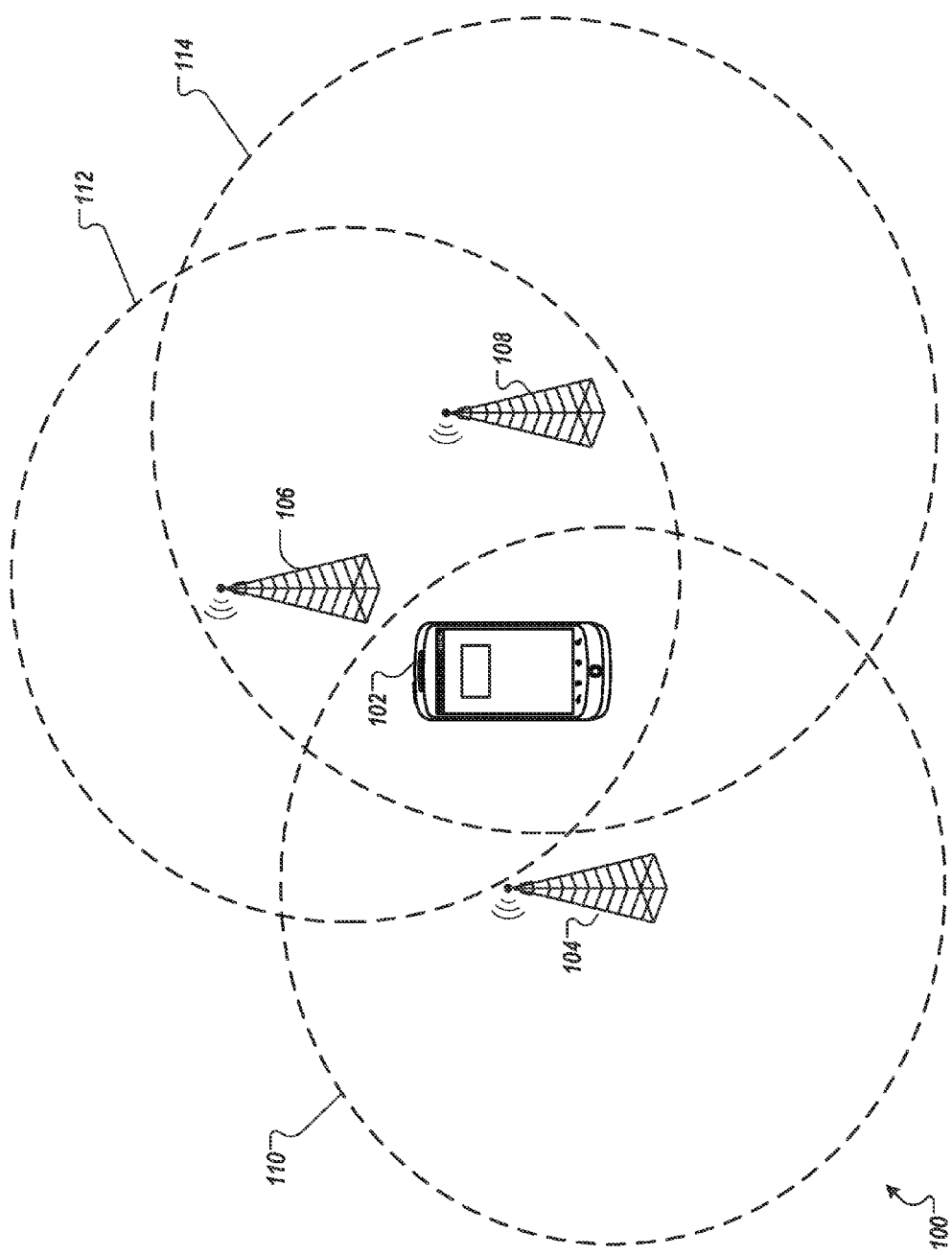
FIG. 1 is a diagram of an example environment in which a client device can communicate with one or more wireless communication networks.

In general, a wireless communication enabled device can establish a connection with various wireless communication networks. For example, a mobile phone can establish a connection with a communications tower of a wireless communications network owned by a particular service provider. The mobile phone can then transmit and receive voice and data communications over the connection. As the wireless communication enabled device changes locations, the wireless communication enabled device may move out of communication range with some wireless communications networks and into communication range for other wireless communications networks. For example, as a person drives along a highway with a mobile phone in his pocket, the available networks with which the mobile phone can establish a communication connection changes (e.g., because one service provider may have invested in more cell phone towers in a region than another service provider). In many geographic locations, numerous wireless communication networks are available to establish communications connections with the wireless communication enabled device.

In some cases, a user of a wireless communication enabled device has a contractual relationship with a particular wireless communication service provider. The service provider can, in turn, have contractual relationships with other service providers by which customers of a particular service provider are allowed to use network resources that are provided by the other service providers. Such relationships can allow a particular wireless communication enabled device to select from a number of different wireless communication networks when establishing a communications connection while located in a particular geographic area. For example, a mobile phone located in a particular geographic area can establish a communications connection with a cellular communications tower that is owned by the service provider with which the user of the mobile phone has a contractual relationship.

In many instances, wireless communications networks capable of providing communications services to wireless communication enabled devices in a particular location offer varying degrees of network communication quality. For example, a first wireless communications network may employ third generation mobile communication technology (i.e., a "3G network"), while a second wireless communications network may employ second generation mobile communication technology (i.e., a "2G network"), and a third wireless communications network may employ fourth generation long-term evolution mobile communication technology (i.e., a "4G LTE network"). Additionally, various different networks employing the same mobile communication technology standard (e.g., three different 3G networks) can have varying levels of service quality among them. For example, a first 3G network may have slower communications speeds (download and upload speeds) than another 3G network in the same geographic area.

In some implementations, a wireless communication enabled device can assign varying network quality scores to different wireless communications networks based on a number of factors including: network type, service provider identity, historically observed network quality (e.g., upload and download speeds), packet loss rate, location, distance of a communications tower from the wireless communication enabled device, and current service quality. When the wireless communication enabled device establishes a communications connection with a particular wireless communications network, the wireless communication enabled device can evaluate the quality of the connection with the wireless communications network. This evaluation can occur at the time that the connection is established or at a later time (for example, when the user attempts to transmit or receive data over the connection). In one example of evaluating the quality of the connection, the wireless communication enabled device can compare observed download rates, upload rates, or both to a threshold level to determine if the communications rate is below the threshold level. As a more specific example, the threshold value can be set at 5 Mbits/s (5 Megabits per second). If the communication rate for the connection falls below 5 Mbits/s, the wireless communication enabled device can identify the connection as a degraded connection.

Upon identifying that the network connection is of a sub-optimal quality (i.e., a degraded connection) the wireless communication enabled device can set a network reevaluation timer and re-check the quality of the network connection when the network reevaluation timer has expired. In some implementations, the length of the network reevaluation timer is set based on the network quality score assigned to the wireless communications network. For example, a wireless communications network having a higher network quality score (e.g., a 4G LTE network) can have a longer network reevaluation timer than a wireless communications network having a lower network quality score (e.g., a 3G network). As another example, the network reevaluation timer can be set to 25 minutes for a 3.5G network while the network reevaluation timer is set to five seconds for a 2G network.

Upon expiration of the network reevaluation timer, the wireless communications network may re-check the quality of the network connection to determine if the quality of the connection is still degraded. If the network quality has improved to a point of no longer being considered degraded, the wireless communication enabled device may continue to use the wireless communications network for wireless communications. If the network quality is still degraded, the wireless communication enabled device switches to another available wireless communications network. Continuing with the above example, the wireless communication enabled device initially compares the download speeds for the network connection to the threshold of 5 Mbits/s. If the download speed is below this threshold value, the wireless communication enabled device starts the network reevaluation timer. In this example, the wireless communications network is a 3.5G network and the wireless communication enabled device sets the network reevaluation timer to 25 minutes (the length of the timer being based on the network type). Upon expiration of the network reevaluation timer, the wireless communication enabled device reevaluates the download speed of the wireless connection. If the download speed is still below 5 Mbits/s, the wireless communication enabled device ends the connection with the wireless communications network and establishes a network connection with a different available wireless communications network.

In some implementations, if the new network that the wireless communication enabled device establishes a connection with after determining that the original network was still degraded has a lower network quality score than the original network, the wireless communication enabled device will switch back to the original network (e.g., immediately or after a predetermined delay). In some implementations, after switching back to the original network, the wireless communication enabled device will "lock on" to the original network for a set period of time before reevaluating the quality of the original network or switching to any other networks. The set period of time may be different than the initial reevaluation timer value (and may be greater). In some implementations, the lock on time can be based on one or more factors including a network quality score for the original network, historical network communication speeds for the original network, the network type of the original network, or the service provider for the original network. The lock on time can also be a predetermined length of time (e.g., three minutes). In some implementations, the wireless communication enabled device is only locked on to the original network while the wireless communication enabled device remains in the same relative geographic area. For example, the wireless communication enabled device can switch to another wireless communications network prior to expiration of the lock on time if the wireless communication enabled device moves to another location (e.g., moves so that the device is served by a different base station).

Turning to FIG. 1, a wireless communication system 100 includes a mobile device 102 which can be employed by a user to send and receive data over various types of wireless networks, such as a communications provider's 3G and/or 4G networks, a local WiFi network, and/or a BLUETOOTH network. For example, the mobile computing device 102 may include a web browser for accessing Internet web pages, and/or may include one or more mobile device applications ("apps") for accessing cloud-based data services. The mobile device 102 can be, for example, a smart phone or other cellular phone device, a tablet device, a laptop computer, a PDA, or any other mobile computing device having wireless communication capability.

The mobile device 102 is located in a geographic area with multiple wireless communications service providers providing wireless communication services. For example, each of the wireless communications service providers can have one or more access towers capable of establishing a communications link with the mobile device 102 at its present location. In some implementations, a wireless communications service providers can have multiple wireless network access points (e.g., communications towers) capable of communicating with a mobile device at a given location.

To communicate data over a network, the mobile computing device 102 may connect with one of the network's access points, such as a 2G, 3G, or 4G network's cell tower, and/or a WiFi network's wireless router. The mobile computing device 102 may include hardware and/or software interfaces for detecting access points that may be in range, for receiving information about the access points (e.g., access point identifiers, signal strength information, network traffic statistics, etc.), and for handling data communication via the access points. In the depicted example system 100, the mobile computing device 102 is presently in range of (and may communicate with) network access points 104, 106, and 108 which may be fee-based access points or free (no fee) access points. For example, a fee-based network access point may be associated with a mobile data network (e.g., 3G mobile data network, 4G mobile data network) that charges a fee (e.g., monthly subscription fee, usage fee) for access to the mobile data network. As another example, a free network access point can be a WiFi access point.

In the example shown in FIG. 1, each of the network access points 104, 106, and 108 has a respective communications range 110, 112, and 114. The mobile device 102 is located in an area where the communications ranges 110, 112, and 114 of the network access points 104, 106, and 108 overlap. Therefore, the mobile device 102 can connect to any of the network access points 104, 106, and 108 to establish a communication connection. For example, the mobile device 102 can establish a connection with the network access point 104 which allows the mobile device 102 to communicate over a cellular communications network to, for example, place a wireless telephone call to another wired or wireless telephone communication enabled device. In some implementations, the network access points 104, 106, and 108 can be affiliated with different wireless communications service providers, employ different wireless communications technologies, and/or have varying levels of communications quality. For example, network access point 104 may be associated with wireless company A, while network access point 106 is associated with wireless company B, and network access point 108 is associated with wireless company C. Furthermore each of network access points 104, 106, and 108 can employ a different wireless communication technology. For example, network access point 104 may be part of a 3G network while network access point 106 is part of a 2G network and network access point 108 is part of a 4G LTE network. The user of the mobile device 102 may have a contractual relationship with one of the wireless companies A, B, and C. Furthermore, the wireless companies A, B, and C may have contractual relationships with each other (or with a different telecommunications service provider with which the user of the mobile device 102 has a mobile service contract) which allows the mobile device 102 to access the networks of wireless companies A, B, and C for wireless communications.

In some implementations, prior to the mobile device 102 establishing a connection with any of the network access points 104, 106, and 108, the mobile device 102 may not have information on network connection quality, network technology level (e.g., 2G, 3G, 4G, etc.), or affiliated service provider for one or more of the network access points 104, 106, and 108. In some cases, the mobile device 102 may possess some but not all of this information for one or more of the network access points 104, 106, and 108. In such situations, the mobile device 102 may select a network access point to establish communications with based on initially detected signal strength, or possibly using a random or pseudo random selection process.

For example, the mobile device 102 can detect that it is within communication range of the network access points 104, 106, and 108 based on being located within the communications ranges 110, 112, and 114. The mobile device 102 can initially establish a connection with the network access point 104. Upon establishing the connection with the network access point 104, the mobile device 102 can obtain or identify information about the network access point 104 and the communication connection with the network access point 104. This can include obtaining or identifying information on a wireless communications service provider associated with the network access point 104, a communications technology employed by the network access point 104, an approximate distance of the mobile device 102 to the network access point 104, and a connection quality level for the connection between the mobile device 102 and the network access point 104. The connection quality level can be based on, for example, upload speeds of data communications, download speeds of data communications, upload speeds for voice communications, download speeds for voice communications, or a combination of any of these and other factors. In some implementations, upload and download speeds can include currently observed upload and download speeds (e.g., upload and download speeds observed by the mobile device 102), historically observed upload and download speeds (e.g., upload and download speeds historically observed by the mobile device 102 and/or other mobile devices), and/or advertised download speeds (e.g., advertised by the network access point when the communications connection is established).

In some implementations, the mobile device 102 can access historic network connection information for one or more of the network access points 104, 106, and 108. For example, the current geographic location of the mobile device 102 can be a location in which the mobile device 102 has been located in the past and the mobile device 102 may have stored information on past communications connections with one or more of the network access points 104, 106, and 108. For example, the mobile device 102 can be currently located in a location that is frequented by the user of the mobile device 102, such as the user's home or workplace. In some implementations, historic network connection information can be information obtained by other mobile devices. For example, a server can receive network connection information from multiple mobile devices and store the information for later retrieval. The mobile device 102 can access the server to receive some or all of the network connection information for a particular network access point, wireless communications service provider, or geographic area. In some implementations, the historic network connection information is stored locally on the mobile device 102. In some implementations, the mobile device 102 will rely only on information that has been observed and/or collected by the mobile device 102.

The historic network connection information can include historically observed download and upload speeds, location information indicating a specific or approximate location for a network access point, an identity of a wireless communications service provider associated with a network access point, or a wireless communication technology being employed by a network access point. In some implementations, the geographic location of the mobile device 102 may be generalized (such as to a city, ZIP code, cellular tower coverage region, or general geographic area), so that a particular location of a user cannot be determined based on preferences selected by the user of the mobile device 102. Thus, the user may have control over how information is collected about his or her location.

In some implementations, the mobile device 102 can use one or more characteristics associated with the network access point 104 or with the communication connection between the mobile device 102 and the network access point 104 to assign one or more ratings to the network access point 104. Characteristics that can be used in determining a rating for the network access point 104 can include the identity of a wireless communications service provider associated with the network access point 104, a communications technology employed by the network access point 104, an approximate distance of the mobile device 102 to the network access point 104, a specific or approximate location of the network access point 104, a specific or approximate location of the mobile device 102, and a connection quality level for the connection between the mobile device 102 and the network access point 104. For example, the mobile device 102 can assign a higher rating to a network access point that employs 4G LTE technology than to a network access point that employs 3G technology. As another example, if network access point 104 has higher observed and/or historic upload and download speeds than network access point 106, the mobile device 102 can assign a higher rating to the network access point 104 than a rating assigned to the network access point 106. As another example, network access point 106 and network access point 108 may employ the same wireless communication technology (e.g., both are part of a 3G network) but may be associated with different wireless communications service providers (e.g., network access point 106 is affiliated with wireless company B and network access point 108 is affiliated with wireless company C). The mobile device 102 can access information on historic connection quality levels for each of wireless company B and wireless company C for the geographic area of the mobile device 102 to assign different ratings to network access point 106 and network access point 108 despite network access point 106 and network access point 108 employing the same wireless communication technology. In some implementations, the mobile device 102 can provide privacy controls that allow a user to indicate what characteristics associated with a network access point or what historic information is collected or what information is used in assigning ratings to the network access point.

In general, the mobile device 102 characteristics such as a more advanced wireless communication technology (e.g., 4G LTE over 3G), higher upload and download speeds, higher levels of historic connection quality for a particular wireless communications service provider (either overall, or based on the geographic area of the mobile device 102), or a closer proximity between the mobile device 102 and a network access point can lead to a higher rating for the network access point. Conversely, characteristics such as a less advanced wireless communication technology (e.g., 2G as compared to 3G), lower upload and download speeds, lower levels of historic connection quality for a particular wireless communications service provider (either overall, or based on the geographic area of the mobile device 102), or a greater distance between the mobile device 102 and a network access point can, in general, lead to a lower rating for the network access point. The mobile device 102 can assign a rating to a network access point at the time of establishing a connection with the network access point or at a later time such as when the mobile device 102 attempts to transmit a voice or data communication over the connection, or at a predetermined time after establishing the connection with the network access point.

Continuing with the above example, the mobile device 102 has established a connection with the network access point 104 and may or may not have assigned a rating to the network access point 104 based on some or all of the above described currently observed or historic characteristics. The mobile device 102 can then determine a current quality of the connection between the mobile device 102 and the network access point 104. In some implementations, the connection quality determination can include calculating a numeric value for the connection. For example, the mobile device 102 can identify current upload and download speeds for the connection and assign a value to the connection quality based on the upload and download speeds. The mobile device 102 can then determine that the connection has degraded below a particular quality level by, for example, comparing the current quality level to a threshold level. For example, if upload and/or download speeds for the connection are below a threshold value, the mobile device 102 can determine that the connection is a degraded connection. Other factors can also be used to determine that the connection has degraded. The mobile device 102 can determine the quality level of the connection, and determine if the connection with the network access point 104 has degraded below the threshold quality level, at the time of establishing a connection with the network access point 104 or at a later time such as when the mobile device 102 attempts to transmit a voice or data communication over the connection, or at a predetermined time after establishing the connection with the network access point 104.

If the connection with the network access point 104 is determined to be a degraded connection, the mobile device 102 can identify a length of time after which the mobile device 102 will reevaluate the quality of the connection. In some implementations, this can involve setting a reevaluation timer or a reevaluation alarm to a set time value and then reevaluating the network connection after the expiration of that set time. In some implementations, the identified length of time after which the mobile device 102 reevaluates the quality of the connection can be determined based on the rating previously assigned to the network access point 104. For example, the higher the rating, the higher the reevaluation time. In some implementations, one or more characteristics of the network access point 104 or the connection between the mobile device 102 and the network access point 104 can be used to identify a reevaluation time without first determining a rating for the network access point 104. For example, the mobile device 102 can assign a 3G network with a reevaluation time of 10 minutes, while the mobile device 102 assigns a 4G LTE network with a reevaluation time of 2 hours. As another example, the mobile device 102 can assign a 3G network affiliated with wireless company A with a reevaluation time of 15 minutes while assigning a 3G network affiliated with wireless company B with a reevaluation time of 23 minutes.

After the identified reevaluation time has passed (or after a reevaluation timer or reevaluation alarm has expired) the mobile device 102 reevaluates the quality of the connection with the network access point 104. If the connection quality has improved (e.g., the connection is no longer degraded, or one or more connection quality metrics are above a threshold level) the mobile device 102 maintains the connection with the network access point 104 and transmits and receives future communications over the connection with the network access point 104. If the connection quality is still in a degraded state (e.g., one or more connection quality metrics are below a threshold level), the mobile device 102 can end the connection with the network access point 104 and switch to another network. For example, if after the reevaluation time has passed, the mobile device 102 determines that the connection with network access point 104 is still in a degraded state (e.g., upload and download speeds are below threshold levels), the mobile device 102 can end the connection with the network access point 104 and establish a connection with the network access point 106.

Setting a timer for reevaluating the quality of the connection with the network access point 104 allows the mobile device 102 avoid switching between communication networks or communication network access points more frequently than is optimal. For example, if the quality of the connection has improved above a threshold or degraded level after the identified reevaluation time is passed, the mobile device 102 can maintain the connection with the network access point 104 rather than switching to another network access point.

In some implementations, if the mobile device 102 determines that the connection with the network access point 104 is degraded at two different points in time (e.g., a first evaluation of the connection quality, followed by a period of time based on the reevaluation timer, and then a second evaluation of the connection quality) rather than disconnecting from the network access point 104 at that point and connecting to a different network access point, the mobile device 102 can set yet another time period to wait before evaluating the connection to the network access point 104 a third time. This second time period can be the same length as the first reevaluation time period, or can be a different length of time. Some or all of the factors used for determining the length of first reevaluation waiting period (e.g., the identity of a wireless communications service provider associated with the network access point 104, a communications technology employed by the network access point 104, an approximate distance of the mobile device 102 to the network access point 104, a specific or approximate location of the network access point 104, a specific or approximate location of the mobile device 102, and historic connection quality level information) can be used to determine the length of the second reevaluation waiting period.

In some implementations, the mobile device 102 can use one or more of these factors to determine if the connection to the network access point 104 should be ended after the second evaluation of the network quality, or if the mobile device 102 should wait a second reevaluation time period before evaluating the connection quality a third time. For example, if the network access point 104 employs 3G technology, the mobile device 102 can disconnect from the network access point 104 and connect to a different network access point after two successive determinations that the connection is degraded. Continuing with this example, if the network access point 104 is a 4G LTE network, the mobile device 102 can determine that a third evaluation of the connection should be performed based on the network access point 104 employing a higher level of network technology. The mobile device 102 can therefore wait for a second reevaluation time period to reevaluate the connection quality a third time if there have been two successive determinations that the connection is degraded.

In some implementations, in response to the mobile device 102 determining that the connection with the network access point 104 is degraded at two or more points in time, the mobile device 102 can end the communication connection with the network access point 104 and establish a connection with another network access point. For example, the mobile device 102 can establish a communications connection with the network access point 106. Upon establishing the connection with the network access point 106, the mobile device 102 can obtain or identify information about the network access point 106 and the communication connection with the network access point 106. This can include obtaining or identifying information on a wireless communications service provider associated with the network access point 106, a communications technology employed by the network access point 106, an approximate distance of the mobile device 102 to the network access point 106, and a connection quality level for the connection between the mobile device 102 and the network access point 106. The connection quality level can be based on, for example, upload speeds of data communications, download speeds of data communications, upload speeds for voice communications, download speeds for voice communications, or a combination of any of these and other factors. In some implementations, upload and download speeds can include currently observed upload and download speeds (e.g., upload and download speeds observed by the mobile device 102), historically observed upload and download speeds (e.g., upload and download speeds historically observed by the mobile device 102 and/or other mobile devices), and/or advertised download speeds (e.g., advertised by the network access point when the communications connection is established). In some implementations, information that is identified or obtained for the network access point 106 can be used by the mobile device 102 to determine if the mobile device 102 should remain connected to the network access point 106 or if the mobile device 102 should return to communicating with the network access point 104 (i.e., reestablish a communications connection with the network access point 104).

For example, the mobile device 102 can identify the mobile communication technology employed by the network access point 106 and use this information to determine if the mobile device 102 should remain in communication with the network access point 106 or return to communicating with the network access point 104. For example, if the identified mobile communication technology for the network access point 106 is a lower level technology than the mobile communication technology employed by the network access point 104, the mobile device 102 will automatically switch back to communicating with the network access point 104. For example, if the network access point 104 is a 3.5G network, and the network access point 106 is a 3G network, if the mobile device 102 has just switched from the network access point 104 to the network access point 106, upon detecting that the network access point 106 is a 3G network, the mobile device 102 switches back to communicating with the network access point 104 because the network access point 104 is a 3.5G network. As another example, if the network access point 104 is a 3.5G network, and the network access point 106 is a 4G network, the mobile device 102 will maintain the connection with the network access point 106 after switching from the network access point 104. In some implementations, other factors can be used instead of or in addition to the mobile communication technology for each network access point when determining whether to switch back to the network access point 104. For example, the current connection quality for the connection to the network access point 106 can be compared to a previously determined connection quality for the previous connection with the network access point 104. If the mobile device 102 identifies that the connection with the network access point 106 is of a lower quality than the previous connection with the network access point 104, the mobile device 102 can switch back to communicating with the network access point 104.

In some implementations, after switching from a first network to a second network and then switching back to the first network as discussed above, the mobile device 102 will "lock on" to the first network for a period of time after switching back to the first network. For example, the mobile device 102 can identify that a connection with the network access point 104 is degraded during two different evaluations of the network (spaced apart by an identified reevaluation time as described above). The mobile device 102 then switches to a connection with the network access point 108. In this example, after establishing the connection with the network access point 108, the mobile device 102 receives information indicating that the network access point 108 is a 3G network. In this example, the network access point 104 is a 4G LTE network, and therefore uses a higher level mobile communications technology than the network access point 108. Upon making this determination, the mobile device 102 switches back to communicating with the network access point 104 and then "locks on" to this connection for a set period of time before evaluating the connection quality to determine if the mobile device 102 should attempt to connect to yet another network.

The lock on time period can be based upon a number of factors including network type, service provider identity, historically observed network quality (e.g., upload and download speeds), packet loss rate, location, distance of a communications tower from the wireless communication enabled device, and current service quality. The lock on time for a particular network access point can be a different length than a reevaluation time for that network access point, even in situations where the same factors are used to determine the lock on time and the reevaluation time. In some implementations, after the lock on time has expired, the mobile device 102 evaluates the connection quality. If the connection quality is below a threshold level (e.g., data download and upload speeds are below threshold download and upload speeds) the mobile device 102 can identify and set a reevaluation time period, and reevaluate the connection quality after the reevaluation time period has expired. Alternatively, upon expiration of the lock on time period, if the mobile device 102 determines that the connection quality is degraded, the mobile device 102 will switch to another network access point at that point rather than waiting for a reevaluation time period to expire and reevaluating the connection quality again.

In response to determining that the connection is degraded after the lock on time period has passed (or after a determination of a degraded connection at the end of the lock on time period followed by a second determination of a degraded connection quality after a reevaluation time period) the mobile device 102 switches to another network. For example, the mobile device 102 can discontinue communications with the network access point 104 and establish a connection with the network access point 106. In some implementations, if the mobile device 102 switches from a first network to a second network, then back to the first network, and identifies a degraded connection with the first network after a lock on time period has passed, the mobile device 102 will not switch back to the second network, but will instead attempt to establish a connection with a third network that is different than the second network.

In some implementations, the mobile device 102 will only remain "locked on" to the network access point 104 after switching back to the network access point 104 if the mobile device 102 does not move out of the present geographic location. If the mobile device 102 moves away from the present geographic location, the lock on time period is ignored and the mobile device 102 may connect to one or more other networks as necessary. In some implementations, a threshold distance of movement can be set and the mobile device 102 must move, geographically, more than the threshold distance before the lock on time is ignored. In some implementations, the mobile device 102 will only ignore the lock on time if the mobile device 102 has moved more than a threshold distance from the network access point 104.

Figure 2:
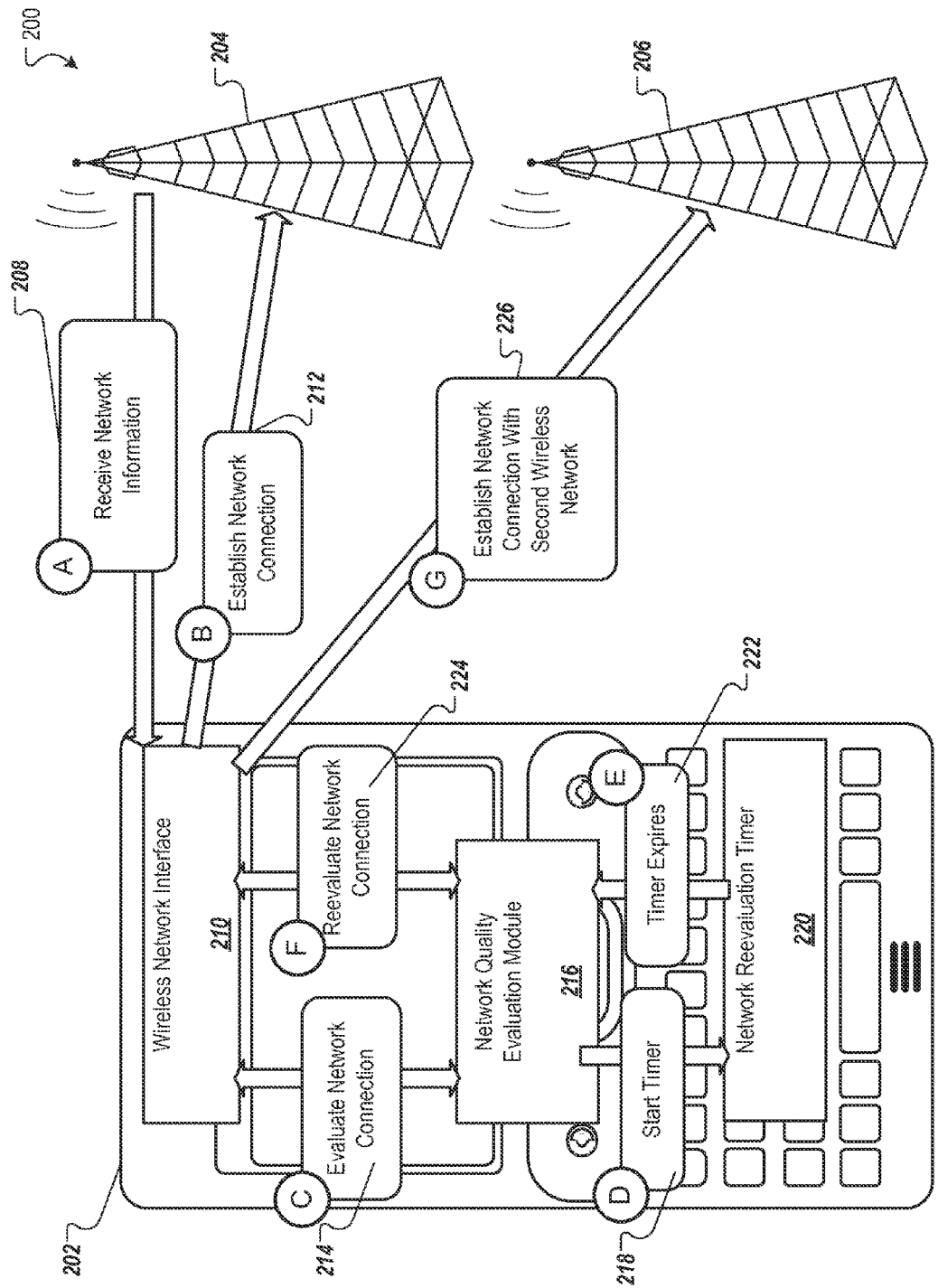
FIG. 2 is a diagram of an example data flow for a client device switching from one wireless communication network to another wireless communication network.

Turning to FIG. 2, a wireless communication enabled user device 202 is within communication range of a network access point 204 and a network access point 206. The user device 202 can be employed by a user to send and receive data over various types of wireless networks, such as a communications provider's 3G and/or 4G networks, a local WiFi network, and/or a BLUETOOTH network. For example, the user device 202 may include a web browser for accessing Internet web pages, and/or may include one or more mobile device applications ("apps") for accessing cloud-based data services. The user device 202 can be, for example, a smart phone or other cellular phone device, a tablet device, a laptop computer, a PDA, or any other computing device having wireless communication capability.

At 208, the user device 202 receives network information from the network access point 204. The network access point 204 can be associated with a service provider and allow the user device 202 to establish a communications connection to send and receive voice and data communications over the service provider's communications network. The network information can be received, for example, by a wireless network interface 210 of the user device 202. The network information transmitted by the network access point 204 and received at the user device 202 can allow the user device 202 to perform a "handshake" with the network access point 204 to establish a communication connection. At 212, the wireless network interface 210 of the user device 202 establishes a connection with the network access point 204.

At 214, a network quality evaluation module 216 evaluates the quality of the network connection between the user device 202 and the network access point 204. The network quality evaluation module 216 can be implemented by a combination of hardware and software. The network quality evaluation module 216 can identify or measure one or more characteristics of the network connection with the network access point 204 to evaluate the quality of the network connection. Characteristics of the network connection that can be identified or measured by the network quality evaluation module 216 can include upload speed, download speed, or pack loss rate. The network quality evaluation module 216 can compare one or more characteristics of the network connection between the user device 202 and the network access point 204 to threshold values to determine if the network connection is degraded. In some implementations, user device 202 can provide privacy controls that allow a user to indicate what characteristics of a network connection or other information is collected or can be accessed by the network quality evaluation module 216 in evaluating the quality of the network connection between the user device 202 and a network access point such as the network access point 204.

If the network quality evaluation module 216 determines that the network connection is degraded, the network quality evaluation module 216 can, at 218, start a network reevaluation timer 220. The network reevaluation timer 220 can be implemented as a separate timer, or as software that monitors one or more clocks of the user device 202 or clock signals received by the user device 202 to determine when a set period of time has passed. The period of time for reevaluation can be determined based on one or more factors including network type associated with the network access point 204, service provider identity for the network access point 204, historically observed network quality (e.g., upload and download speeds), location, distance of the network access point 204 from the user device 202, and current service quality. For example, the network reevaluation timer 220 can be set for a longer time if the network access point 204 is a 4G network than if the network access point 204 is a 3G network. As another example, the network reevaluation timer 220 is set for a longer time for a first service provider identified as having a better network than a second service provider in the present geographic area based on historically observed data for the first and second service providers. In some implementations, the time period for the network reevaluation timer 220 is determined based on a rating assigned to the network access point 204. For example, the user device 202 can use one or more characteristics associated with the network access point 204 or with the communication connection between the user device 202 and the network access point 204 to assign one or more ratings to the network access point 204. This rating can then be used to identify a reevaluation time period for the network access point 204 and the network reevaluation timer 220 can be set to the identified reevaluation time period.

At 222, the network reevaluation timer 220 expires. For example, the network quality evaluation module 216 or one or more other components of the user device 202 can determine that a set reevaluation time has passed. As another example, the network reevaluation timer 220 can inform the network quality evaluation module 216 that the identified reevaluation time has passed. At 224, in response to the network reevaluation time expiring, the network quality evaluation module 216 reevaluates the quality of the network connection between the user device 202 and the network access point 204.

If the network quality evaluation module 216 determines, at 224, that the network connection is still degraded (e.g., one or more characteristics of the connection is below a threshold level) the user device 202 ends the network connection with the network access point 204. At 226, in response to the network quality evaluation module 216 determining that the network connection with the network access point 204 was still in a degraded state (at 224) the wireless network interface 210 establishes a network connection with the network access point 206.

In some implementations, if the wireless communication technology employed by the network access point 206 is below the level of the wireless communication technology employed by the network access point 204, the user device 202 will switch back to communicating with the network access point 204. In some implementations, the user device 202 can make a determination to switch back to the network access point 204 based on one or more other factors associated with the network access point 206 or the connection between the user device 202 and the network access point 206, such as a current communication rate or an identity of a service provider associated with the network access point 206. After switching back to the network access point 204, the user device 202 can remain "locked on" to communication with the network access point 204 for a set period of time (determined based on one or more factors associated with the network access point 204) or until the geographic location of the user device 202 changes.

Figure 3:
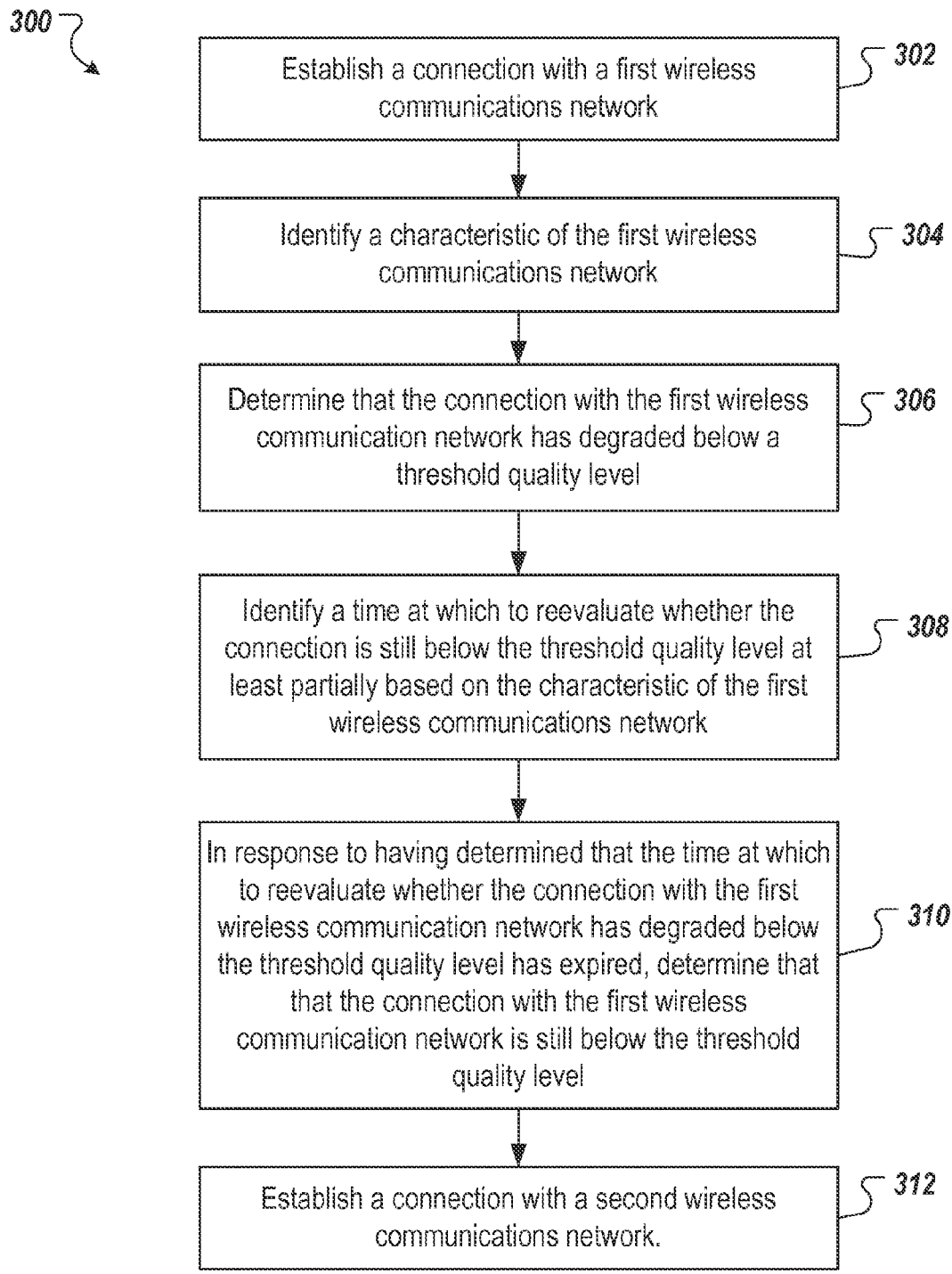
FIG. 3 is a flow chart of an example process for switching from a first wireless communication network to a second wireless communication network.

FIG. 3 shows a flow chart of an example process 300 for switching from a first wireless communication network to a second wireless communication network. The process 300 can be performed by one or more devices in the systems depicted in FIG. 1 or 2. For example, the process 300 can be performed by the mobile device 102 of FIG. 1 or the user device 202 of FIG. 2. Operations of the process 300 can be implemented by execution of instructions stored on a non-transitory computer readable medium. Execution of the instructions causes one or more data processing apparatus to perform operations of the process 300.

A connection with a first wireless communications network is established (302). For example, a wireless communication enabled device can be within communication range of a number of wireless network access points. The wireless network access points can be, for example, cellular communications towers, WiFi routers, or other wireless network access devices. The wireless communication enabled device establishes a connection with one of the wireless network access points in communication range.

A characteristic of the first wireless communications network is identified (304). The identified characteristic can be network type, service provider identity, historically observed network quality (e.g., upload and download speeds), packet loss rate, location, distance of a communications tower from the wireless communication enabled device, and current service quality. For example, the wireless communication enabled device can identify that the first wireless communications network is a 3G network. The identified characteristic can be based on currently observed information and/or historically observed information associated with the first wireless communications network. In some implementations, the identified characteristic can be used to assign a rating to the first wireless communications network. The rating can be determined based on the identified characteristic alone, or using the identified characteristic in combination with one or more other characteristics associated with the first wireless communications network or the connection between the wireless communication enabled device and the first wireless communications network.

A determination that the connection with the first wireless communication network has degraded below a threshold quality level can be made (306). For example, the wireless communication enabled device can measure one or more characteristics of the connection with the first wireless communications network and compare the characteristics to threshold levels to determine if the quality of the connection has degraded. These characteristics can include upload speed, download speed, and packet loss rate. For example, if the upload speed for the connection is below a threshold level, the wireless communication enabled device can determine that the connection is degraded. As another example, if the download speed for the connection is below a threshold level, the wireless communication enabled device can determine that the connection is degraded.

A time at which to reevaluate whether the connection is still below the threshold quality level is identified (308). The time at which to reevaluate whether the connection is still below the threshold quality level, (or, "reevaluation time") can be at least partially based on the characteristic of the first wireless communications network identified at 304. For example, the reevaluation time can be identified based on a level of wireless communications technology employed by the first wireless communications network, with a higher level technology (e.g., a 4G LTE network) having a higher reevaluation time than a lower level technology (e.g., a 2G network). In some implementations, the reevaluation time is based on a rating assigned to the first wireless communications network, the rating having been based at least in part on the characteristic identified at 304.

A determination that the connection with the first wireless communication network is still below the threshold quality level is made (310). This determination can be made in response to having determined that the time at which to reevaluate whether the connection with the first wireless communication network has degraded below the threshold quality level (the "reevaluation time") has expired. For example, the wireless communication enabled device can determine that the identified reevaluation time has passed since the first time that the connection quality was assessed at 306. Upon determining that the identified reevaluation time has passed, the wireless communication enabled device can evaluate the connection with the first wireless communications network to determine that the connection is still below the threshold quality level. For example, the download speed for the connection may have changed since the first evaluation of the connection at 306, but is still below the threshold download speed value.

A connection with a second wireless communications network is established (312). The connection with the second wireless communications network can be established in response to determining that the connection with first wireless communication network had degraded below the threshold quality level at 306 and determining that the connection with the first wireless communication network was still below the threshold quality level at 310. For example, the wireless communication enabled device can end the connection with the first wireless communications network and establish a connection with a second, different, wireless communications network that is within communication range of the wireless communication enabled device.

FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may also include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

A number of embodiments of the invention have been described. Nevertheless, it will be understood that various modifications may be made without departing from the spirit and scope of the invention. For example, one or more functions described as being performed by a mobile computing device can be performed by one or more remote servers and the results of these functions can be communicated to the mobile computing device. For example, a rating for a wireless communications network access point can be made by a remote server based on one or more characteristics of the wireless communications network access point. The remote server can then convey the rating to the mobile computing device. Accordingly, other embodiments are within the scope of the following claims.

What is claimed is:

1. A computer-implemented method comprising:
   establishing, by a computing device, a connection with a first wireless communication network;
   identifying, by the computing device, a characteristic of the first wireless communication network;
   determining, by the computing device and at a first point in time, that the connection with the first wireless communication network has degraded below a threshold quality level;
   identifying, by the computing device, a time at which to reevaluate whether the connection with the first wireless communication network is still below the threshold quality level, the time identified at least partially based on the characteristic of the first wireless communication network;
   determining, by the computing device, at a second point in time and in response to having determined that the time at which to reevaluate whether the connection with the first wireless communication network is still below the threshold quality level has expired, that the connection with the first wireless communication network is still below the threshold quality level; and
   responsive to determining, at the first point in time, that the connection with the first wireless communication network had degraded below the threshold quality level and determining, at the second point in time, that the connection with the first wireless communication network was still below the threshold quality level, establishing, by the computing device, a connection with a second wireless communication network.

2. The method of claim 1, wherein the characteristic identifies a mobile communication technology employed by the first wireless communication network.

3. The method of claim 1, wherein identifying the characteristic of the first wireless communication network includes identifying the characteristic based on historically observed network connectivity speeds for the first wireless communication network.

4. The method of claim 1, wherein identifying the time at which to reevaluate whether the connection with the first wireless communication network is still below the threshold quality level includes assigning a rating to the first wireless communication network, the rating being based on at least one of a mobile communication technology employed by the first wireless communication network and historically observed network connectivity speeds for the first wireless communication network.

5. The method of claim 1, wherein the characteristic identifies a wireless communications service provider associated with the first wireless communication network.

6. The method of claim 1, wherein the threshold quality level is determined based on historically observed network connectivity quality for a plurality of wireless communication networks.

7. The method of claim 1, further comprising:
   identifying, by the computing device, a characteristic of the second wireless communication network;
   determining, by the computing device and at a third point in time, that the connection with the second wireless communication network has degraded below the threshold quality level;
   identifying, by the computing device, another time at which to reevaluate whether the connection with the second wireless communication network is still below the threshold quality level at least partially based on the characteristic of the second wireless communication network;
   determining, by the computing device, at a fourth point in time and in response to having determined that the another time at which to reevaluate whether the connection with the second wireless communication network is still below the threshold quality level has expired, that the connection with the second wireless communication network is still below the threshold quality level; and
   responsive to determining, at the third point in time, that the connection with the second wireless communication network had degraded below the threshold quality level and determining, at the fourth point in time, that the connection with the first wireless communication network was still below the threshold quality level, establishing, by the computing device, a connection with a third wireless communication network.

8. The method of claim 7, wherein:
   the time at which to reevaluate whether the connection with the first wireless communication network is still below the threshold quality level is identified using a first reevaluation length of time calculated based on the characteristic of the first wireless communication network;
   the another time at which to reevaluate whether the connection with the second wireless communication network is still below the threshold quality level is identified using a second reevaluation length of time calculated based on the characteristic of the second wireless communication network; and
   the first reevaluation length of time is different than the second reevaluation length of time.

9. The method of claim 1, further comprising:
   identifying, by the computing device, a characteristic of the second wireless communication network;
   comparing, by the computing device, the characteristic of the first wireless communication network to the characteristic of the second wireless communication network to determine that the characteristic of the first wireless communication network is superior to the characteristic of the second wireless communication network; and responsive to determining that the characteristic of the first wireless communication network is superior to the characteristic of the second wireless communication network, ending the connection with the second wireless communication network and establishing another connection with the first wireless communication network.

10. The method of claim 9, further comprising:

identifying, by the computing device, a minimum length of time to maintain the another connection with the first wireless communication network;

determining, by the computing device, at a third point in time, and in response to having determined that the minimum length of time to maintain the another connection with the first wireless communication network has expired, that the another connection with the first wireless communication network has degraded below a threshold quality level;

identifying, by the computing device, another time at which to reevaluate whether the another connection with the first wireless communication network is still below the threshold quality level at least partially based on the characteristic of the first wireless communication network;

determining, by the computing device, at a fourth point in time and in response to having determined that the another time at which to reevaluate whether the another connection is still below the threshold quality level has expired, that the another connection with the first wireless communication network is still below the threshold quality level; and responsive to determining, at the third point in time, that the another connection with the first wireless communication network had degraded below the threshold quality level and determining, at the fourth point in time, that the another connection with the first wireless communication network was still below the threshold quality level, establishing, by the computing device, a connection with a third wireless communication network.

11. A mobile computing device comprising:

a wireless communications interface;

a data store storing executable instructions; and one or more processors that interact with the data store and execute instructions that cause the mobile computing device to perform operations comprising:

establishing, using the wireless communications interface, a connection with a first wireless communication network;

identifying a characteristic of the first wireless communication network;

determining, at a first point in time, that the connection with the first wireless communication network has degraded below a threshold quality level;

identifying a time at which to reevaluate whether the connection with the first wireless communication network is still below the threshold quality level, the time identified at least partially based on the characteristic of the first wireless communication network;

determining, at a second point in time and in response to having determined that the time at which to reevaluate whether the connection with the first wireless communication network is still below the threshold quality level has expired, that the connection with the first wireless communication network is still below the threshold quality level; and responsive to determining, at the first point in time, that the connection with the first wireless communication network had degraded below the threshold quality level and determining, at the second point in time, that the connection with the first wireless communication network was still below the threshold quality level, establishing, using the wireless communications interface, a connection with a second wireless communication network.

12. The mobile computing device of claim 11, wherein the characteristic identifies a mobile communication technology employed by the first wireless communication network.

13. The mobile computing device of claim 11, wherein identifying the characteristic of the first wireless communication network includes identifying the characteristic based on historically observed network connectivity speeds for the first wireless communication network.

14. The mobile computing device of claim 11, wherein identifying the time at which to reevaluate whether the connection with the first wireless communication network is still below the threshold quality level includes assigning a rating to the first wireless communication network, the rating being based on at least one of a mobile communication technology employed by the first wireless communication network and historically observed network connectivity speeds for the first wireless communication network.

15. The mobile computing device of claim 11, wherein the characteristic identifies a wireless communications service provider associated with the first wireless communication network.

16. The mobile computing device of claim 11, wherein the threshold quality level is determined based on historically observed network connectivity quality for a plurality of wireless communication networks.

17. The mobile computing device of claim 11, the operations further comprising:

identifying a characteristic of the second wireless communication network;

determining, at a third point in time, that the connection with the second wireless communication network has degraded below the threshold quality level;

identifying another time at which to reevaluate whether the connection with the second wireless communication network is still below the threshold quality level at least partially based on the characteristic of the second wireless communication network;

determining, at a fourth point in time and in response to having determined that the another time at which to reevaluate whether the connection with the second wireless communication network is still below the threshold quality level has expired, that the connection with the second wireless communication network is still below the threshold quality level; and responsive to determining, at the third point in time, that the connection with the second wireless communication network had degraded below the threshold quality level and determining, at the fourth point in time, that the connection with the first wireless communication network was still below the threshold quality level, establishing, using the wireless communications interface, a connection with a third wireless communication network.

18. The mobile computing device of claim 17, wherein:
the time at which to reevaluate whether the connection with the first wireless communication network is still below the threshold quality level is identified using a first reevaluation length of time calculated based on the characteristic of the first wireless communication network;
the another time at which to reevaluate whether the connection with the second wireless communication network is still below the threshold quality level is identified using a second reevaluation length of time calculated based on the characteristic of the second wireless communication network; and
the first reevaluation length of time is different than the second reevaluation length of time.

19. The mobile computing device of claim 11, the operations further comprising:
identifying a characteristic of the second wireless communication network;
comparing the characteristic of the first wireless communication network to the characteristic of the second wireless communication network to determine that the characteristic of the first wireless communication network is superior to the characteristic of the second wireless communication network; and
responsive to determining that the characteristic of the first wireless communication network is superior to the characteristic of the second wireless communication network, ending the connection with the second wireless communication network and establishing another connection with the first wireless communication network.

20. The mobile computing device of claim 19, the operations further comprising:
identifying a minimum length of time to maintain the another connection with the first wireless communication network;
determining, at a third point in time, and in response to having determined that the minimum length of time to maintain the another connection with the first wireless communication network has expired, that the another connection with the first wireless communication network has degraded below a threshold quality level;
identifying another time at which to reevaluate whether the another connection with the first wireless communication network is still below the threshold quality level at least partially based on the characteristic of the first wireless communication network;
determining, at a fourth point in time and in response to having determined that the another time at which to reevaluate whether the another connection is still below the threshold quality level has expired, that the another connection with the first wireless communication network is still below the threshold quality level; and
responsive to determining, at the third point in time, that the another connection with the first wireless communication network had degraded below the threshold quality level and determining, at the fourth point in time, that the another connection with the first wireless communication network was still below the threshold quality level, establishing, using the wireless communications interface, a connection with a third wireless communication network.

* * * * *